US011749904B2

United States Patent
Kim et al.

(10) Patent No.: US 11,749,904 B2
(45) Date of Patent: Sep. 5, 2023

(54) ELECTRONIC DEVICE WITH HIGH FREQUENCY MODULE

(71) Applicant: Samsung Electro-Mechanics Co., Ltd, Suwon-si (KR)

(72) Inventors: Dooil Kim, Suwon-si (KR); Sungyoul Choi, Suwon-si (KR); Jung-Sun Kwon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 164 days.

(21) Appl. No.: 17/230,124

(22) Filed: Apr. 14, 2021

(65) Prior Publication Data

US 2022/0021127 A1    Jan. 20, 2022

(30) Foreign Application Priority Data

Jul. 15, 2020   (KR) .................. 10-2020-0087627

(51) Int. Cl.
*H01Q 21/06*    (2006.01)
*G06F 3/01*    (2006.01)
*G06F 3/041*    (2006.01)
*H01Q 1/27*    (2006.01)

(52) U.S. Cl.
CPC .......... *H01Q 21/065* (2013.01); *G06F 3/017* (2013.01); *G06F 3/041* (2013.01); *H01Q 1/273* (2013.01)

(58) Field of Classification Search
CPC ...... H01Q 21/065; H01Q 1/273; G06F 3/017; G06F 3/041
See application file for complete search history.

(56) References Cited

U.S. PATENT DOCUMENTS

| | | | |
|---|---|---|---|
| 2017/0285844 A1* | 10/2017 | Park | ................. G06F 1/1647 |
| 2020/0064996 A1 | 2/2020 | Giusti et al. | |
| 2020/0067176 A1 | 2/2020 | Kim et al. | |
| 2022/0302576 A1* | 9/2022 | Wang | ................. H01Q 1/44 |

FOREIGN PATENT DOCUMENTS

| | | |
|---|---|---|
| JP | 2016-12819 A | 1/2016 |
| KR | 10-2009382 B1 | 8/2019 |

OTHER PUBLICATIONS

GOOGLE radar sensor, SOLI "Simple in Complex with Simple", https://makefortune2.tistory.com/80 (6 pages in English and Korean).
Park, et al. "An optically invisible antenna-on-display concept for millimeter-wave 5G cellular devices." IEEE Transactions on Antennas and Propagation 67.5 (2019) (12 pages in English).

* cited by examiner

*Primary Examiner* — Michael Pervan
(74) *Attorney, Agent, or Firm* — NSIP Law

(57) ABSTRACT

An electronic device including a high frequency module is disclosed. The electronic device includes a display panel configured to display an image; a first connecting member positioned on a lateral side or a rear side of the display panel; a radio frequency integrated circuit (RFIC) chip mounted on the first connecting member; an antenna disposed on a front side of the display panel; and a second connecting member configured to electrically connect the first connecting member and the antenna, and formed to be more flexible than the first connecting member.

23 Claims, 25 Drawing Sheets

ELECTRONIC DEVICE WITH HIGH FREQUENCY MODULE

CROSS-REFERENCE TO RELATED APPLICATIONS

This application claims the benefit under 35 USC 119(a) of Korean Patent Application No. 10-2020-0087627 filed on Jul. 15, 2020 in the Korean Intellectual Property Office, the entire disclosure of which is incorporated herein by reference for all purposes.

BACKGROUND

1. Field

The following description relates to an electronic device with a high frequency module.

2. Description of Related Art

Developments pertaining to wireless communication systems have recently changed the lifestyles of individuals. To support latent wireless application programs such as multimedia devices, Internet of things, and intelligent transport systems, high-quality mobile systems with Gigabit data rates per second are beneficial. This may not be realized because of the limited bandwidth in the current fourth generation communication system. Accordingly, the International Telecommunication Union allowed use of the mmWave spectrum for the fifth generation (5G) application range so as to overcome the bandwidth limit issue.

Recently, high frequency modules for fluently realizing the mmWave communication, including the 5G communication, has been implemented.

As the 5G communication becomes commercially available, high-rate and high-capacity data service uses are increasing, the group of customers using various image contents is increasing, and smartphones are being implemented as the best communication device or system, instead of televisions, for consuming large-capacity image content. A user watching video with a smartphone may perform various commands by touching the screen of the smartphone, and in this example, the screen may be hidden by this touch, the user may press a wrong area of the screen, or the screen may become dirty if it is touched by an unclean hand of the user.

The above information disclosed in this Background section is only for enhancement of understanding of the background of the invention, and therefore it may contain information that does not form the prior art that is already known in this country to a person of ordinary skill in the art.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In a general aspect, an electronic device includes a display panel, comprising a display screen configured to display an image; an antenna, attached to the display panel, and disposed on the display screen; a first connecting member, positioned external to the display screen; a radio frequency (RF) signal processing circuit, mounted on the first connecting member; and a second connecting member, configured to electrically connect the first connecting member and the antenna, and configured to be more flexible than the first connecting member.

The antenna may be positioned adjacent to a right edge and a left edge of the display screen.

The display screen may be vertically partitioned in an upper region, a middle region, and a lower region, and the antenna may be positioned in at least one region of the upper region, the middle region, and the lower region.

The antenna may be configured so that a plurality of antenna patches are formed in pairs to be symmetric with respect to a width-directional center axis of the display screen, and are positioned on the right edge and the left edge of the display screen.

The antenna patches may include at least one pair of transmitting antenna patches and at least one pair of receiving antenna patches.

The display panel may be configured to have a stacked structure including a plurality of layers, and the antenna may be positioned in the stacked structure of the display panel.

The display panel may further include an image display layer and a touch screen panel layer that is stacked on the image display layer, and the antenna may be positioned on the touch screen panel layer, or may be positioned between the touch screen panel layer and the image display layer.

The display panel may further include a touch screen panel layer, and the antenna may be formed with a plurality of antenna patches and feeders that are patterned on the touch screen panel layer.

The display panel may further include a cover glass, and the antenna may be positioned on a bottom layer of the cover glass, or may be positioned on a top layer of the cover glass.

The electronic device may further include a bezel, configured to cover at least a portion of an edge of the display panel, wherein the antenna may be at least partly positioned on a portion of the display panel covered with the bezel.

The antenna may include a patch having a plane in parallel to a surface of the display screen, and a feeder that extends from the patch.

The first connecting member may be positioned on one of a lateral side and a rear side of the display panel.

The RF signal processing circuit may include one of a radio frequency integrated circuit (RFIC) chip and an extended front-end module (eFEM) chip.

The antenna and the RF signal processing circuit may be configured to be a printed circuit board (PCB)—liquid crystal polymer (LCP) integrated board.

The antenna may be a gesture sensing antenna configured to be operable in a frequency bandwidth equal to or greater than 60 GHz.

In a general aspect, a smart glasses device includes a lens, comprising a transparent display panel comprising a display screen configured to display an image; an antenna, positioned adjacent to an edge of the lens; and a glasses frame, coupled with the lens, and configured to support the lens.

The antenna may be coupled to the transparent display panel, and may be positioned on the display screen.

The antenna may be positioned on the glasses frame.

In a general aspect, a smart watch includes a display panel comprising a display screen configured to display an image; and an antenna, positioned adjacent to an edge of the display screen.

The antenna may be coupled to the display panel, and may be positioned on the display screen.

The antenna may be positioned adjacent to an outer edge of the display screen.

The antenna may be configured so that a plurality of antenna patches are formed in pairs to be symmetric with respect to a width-directional center axis of the display screen.

The plurality of antenna patches may include one pair of transmitting antenna patches and two pairs of receiving antenna patches.

The antenna may be a gesture sensing antenna.

Other features and aspects will be apparent from the following detailed description, the drawings, and the claims.

Figure 1:
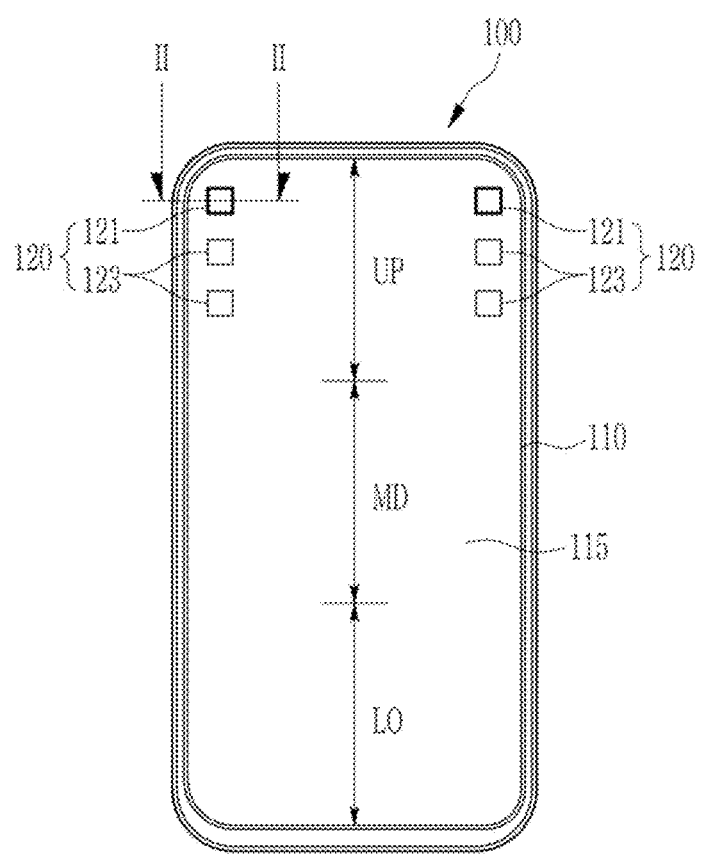
FIG. 1 illustrates a top plan view on an example electronic device including a high frequency module, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative size, proportions, and depiction of elements in the drawings may be exaggerated for clarity, illustration, and convenience.

Subsequently, examples are described in further detail with reference to the accompanying drawings.

Figure 2:
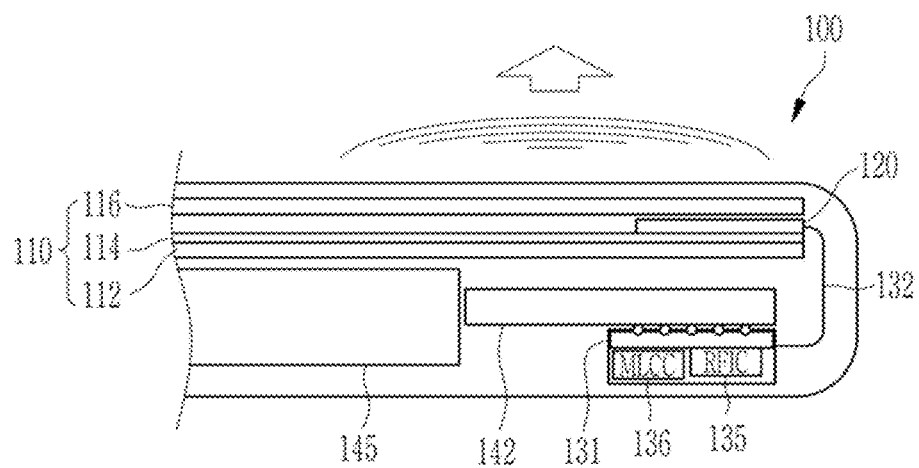
FIG. 2 illustrates a cross-sectional view with respect to a line II-II of FIG. 1.

FIG. 1 illustrates a top plan view on an example electronic device including a high frequency module, in accordance with one or more embodiments, and FIG. 2 illustrates a cross-sectional view with respect to a line II-II of FIG. 1. FIG. 1 illustrates a portable phone as an example of the electronic device 100 including a high frequency module, in accordance with one or more embodiments. However, this is only an example, and the electronic device 100 may include, as non-limiting examples, a smart phone, a personal digital assistant, a digital video camera, a digital still camera, a network system, a computer, a monitor, a tablet, a laptop, a netbook, a television, a video game, a smart watch, and an automotive part, but is not limited thereto.

Referring to FIG. 1, the electronic device 100 includes a display panel 110 that displays images, and an antenna 120 positioned on a front side of the display panel 110.

Referring to the display panel 110, a front side of the display panel 110 and a rear side of the display panel 110 face each other in opposite directions, and a lateral side connects the edges of the front side of the display panel 110 and the rear side of the display panel 110. That is, the front side of the display panel 110 represents a side on which a display screen 115 is positioned, and which displays an image, and the rear side indicates a side on which electronic parts such as a driving circuit for displaying the image of the display screen 115 may be disposed. When the display panel 110 has a screen in a rectangular shape that is vertically elongated, it may be divided into three portions including an upper region (UP), a middle region (MD), and a lower region (LO).

In a non-limiting example, the antenna 120 may be positioned adjacent to right and left edges of the upper region (UP) of the display screen 115 on the front side of the display panel 110. A plurality of antennae 120 may be positioned in pairs on the right and the left of the display screen 115, and as an example, the plurality of antennae 120 may include one pair of transmitting (Tx) patches 121 and two pairs of receiving (Rx) patches 123. That is, the antennas may be configured, as non-limiting examples, with two Tx patches and four Rx patches.

Referring to FIG. 2, the antenna 120 may be disposed in a stacked structure of the display panel 110. In an example, the display panel 110 may include an image display layer 112 and a touch screen panel (TSP) layer 114, and may include a cover glass 116 to cover and protect the image display layer 112 and the TSP layer 114. In this instance, the antenna 120 may be positioned between the cover glass 116 and the TSP layer 114. That is, a predetermined number of transmitting (Tx) patches 121 and receiving (Rx) patches 123 that configure the antenna 120, may be positioned on the TSP layer 114. In this instance, the transmitting/receiving (Tx/Rx) patches of the antenna 120 may be disposed on a layer that is different from that of the electrode configuring the TSP layer 114, and as an option, the transmitting/receiving (Tx/Rx) patches of the antenna 120 may be disposed on a same layer as the electrode configuring the TSP layer 114.

The image display layer 112 may be selected in various ways according to types of the display panel 110, and in an example, the image display layer 112 may include a liquid crystal display (LCD) or an organic light emitting diode (OLED). When a user presses an area of the display screen 115, or contacts the display screen 115 with a finger or a pen or stylus, the TSP layer 114 may detect or recognize the position of the finger or stylus, and transmit the detected position to the system. The TSP layer 114 may, for example, be configured with an upper plate and a rear plate on which a transparent electrode (or an indium tin oxide (ITO)) is deposited.

A first connecting member 131 may be positioned on the rear side of the display panel 110, and a radio frequency integrated circuit (RFIC) chip 135 and a multilayer ceramic capacitor (MLCC) 136 may be mounted on the first connecting member 131. A second connecting member 132, that electrically connects the first connecting member 131 and the antenna 120, may be installed, and the second connecting member 132 may be formed to be at least partially more flexible than the first connecting member 131, so that it may be bent to enable a connection. In an example, the first connecting member 131 may include a printed circuit board (PCB), and the second connecting member 132 may include a flexible printed circuit board (FPCB).

Therefore, the antenna 120 may be disposed to face a front direction on the front side of the display panel 110, and the RFIC chip 135 may be disposed on the rear side of the display panel 110. Accordingly, the second connecting member 132, which may be made of a flexible material, may be bent on the lateral side of the display panel 110, and may enable a connection between the antenna 120 and the RFIC chip 135. Accordingly, the antenna 120 may receive the RF signal from the RFIC chip 135.

A display panel 110, a main board 142, that drives the electronic device 100 including the display panel 110, and a battery 145 that supplies a power voltage, may be disposed on the rear side of the display panel 110. The electronic parts that drive the electronic device 100 may be mounted on the main board 142, and may be connected to each other through circuit wires, and the first connecting member 131 may be mounted on the main board 142.

In the example, the antenna 120, disposed on the front side of the display panel 110, may be implemented, as a non-limiting example, as a gesture sensing antenna. In an example, the antenna 120 may be configured to be operable in a frequency bandwidth that is equal to or greater than 60

GHz based on mmWave-based super high frequency, and may be applied to a gesture sensing process. That is, the high frequency module may be realized to include the transmitting and/or receiving (Tx/Rx) ends of an antenna that is manufactured as a 60 GHz WiGig or a 77 GHz Radar, and the RFIC.

The two transmitting (Tx) patches 121 and four receiving (Rx) patches 123 configuring the antenna 120 that is implemented for a sensing process, may be spaced from each other by a predetermined distance. The gesture sensing range may be increased based on the predetermined distance, and the antenna 120 may sense an operation that the display panel 110 is separated from the display screen 115, and may then move in a predetermined direction while the user views the image.

The antenna that senses a gesture may be separately mounted from a general communication antenna, and a RFIC chip 135 that senses gestures may also be separately configured and disposed. Further, when the antenna that senses a gesture is installed, the antenna that senses a gesture disposed on the display may be added in a switch form in the RFIC chip for a general communication purpose. In this example, an application may be provided to perform a gesture sensing operation in the RFIC chip for a general communication purpose.

In the example of the 60 GHz WiGig, when this frequency is mainly used for the communication purpose, and is also used for a gesture sensing purpose if needed, an application may be supplemented so that an antenna on the gesture sensing display is additionally configured in a switch form in addition to the WiGig frequency, this frequency is used, and this function may be performed in the WiGig chipset. That is, the gesture sensing function may be easily added by combining the antenna on the display for a gesture sensing to the WiGig chipset and the antenna. In another example, the 77 GHz radar may be configured with an additional chipset and the antenna on the display.

Figure 3:
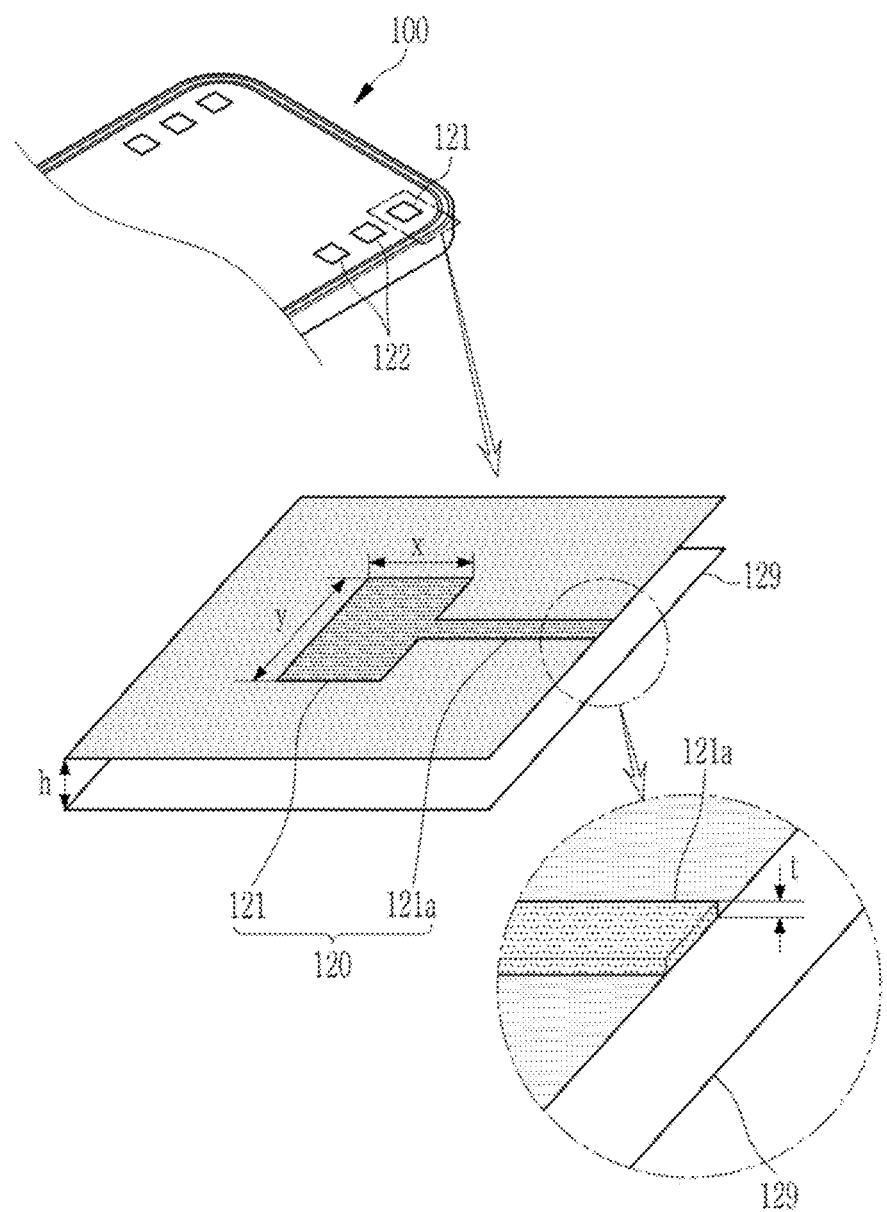
FIG. 3 illustrates a perspective view on an enlarged example antenna portion in an example electronic device including a high frequency module according to an embodiment described with reference to FIG. 1.

FIG. 3 illustrates a perspective view of an enlarged example antenna portion in an electronic device including a high frequency module, in accordance with one or more embodiments described with reference to FIG. 1.

Referring to FIG. 3, the antenna 120 may include a patch 121 and a feeder 121a extending from the patch 121. The patch 121 and the feeder 121a may be formed when patterned with a conductive material in the stacked structure of the display panel 110, and in an example, they may be patterned together with the TSP electrodes on the TSP layer (114, refer to FIG. 2). The patch 121 and the feeder 121a may be made of, as non-limited examples, an ITO or metallic material. A ground layer 129 may be disposed on another layer that is separated from the layer on which the patch 121 and the feeder 121a are positioned by a predetermined distance. As the ground layer 129, a ground portion provided in the image display layer 112 or the TSP layer 114 constituting the display panel 110 may be used.

In another example, the antenna 120 including the patch 121 and the feeder 121a may be disposed to be positioned on a top layer of the TSP layer 114 or between the TSP layer 114 and the image display layer 112. Additionally, the antenna 120 may be disposed on a lower layer of the cover glass 116 or an upper portion of the cover glass 116. Therefore, the antenna 120 may be disposed in various ways according to the structure and the shape of the electronic device 100, and any configurations that sense a gesture operation on the front side of the display panel 110 may be modified and applied without being limited to the position of the antenna 120 in a cross-sectional view.

In the example, the patch 121 of the antenna 120 may have a rectangular shape with a horizontal length (x) and a perpendicular length (y), in parallel with the display screen 115 of the display panel 110 and traversing each other, in a plan view. In this instance, the patch 121 may have a thickness (t) measured in a perpendicular direction to the display screen 115, and may be spaced from the ground layer 129 in the thickness (t) direction by a height (h). Therefore, when the antenna 120 on the display is designed, the horizontal length (x), the perpendicular length (y), the thickness (t), and the height (h) of the patch 121 may become variables that may be set by considering performance of the antenna 120. The antenna may be designed by additionally considering a material and a dielectric constant of the antenna 120 and a condition of the display panel 110.

FIG. 4 to FIG. 8 illustrate perspective views of an example antenna portion according to one or more embodiments described with reference to FIG. 1.

The antenna disposed on the display panel 110 may include a patch and a feeder, and in this instance, the patch may be modified into various shapes and sizes according to the design condition and may then be applied.

Figure 4:
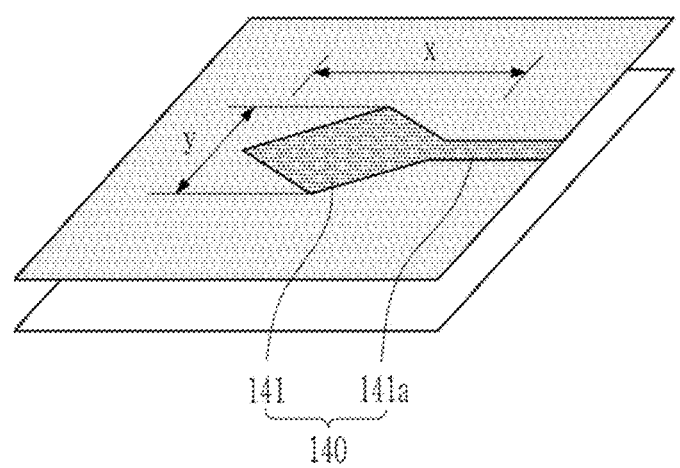
FIG. 4 to FIG. 8 illustrate perspective views on an example antenna portion, in accordance with one or more embodiments described with reference to FIG. 1.

In an example described with reference to FIG. 4, the antenna 140 may include a patch 141 having a rhombus or parallelogram shape in a plan view, and a feeder 141a extending from the patch 141. The patch 141 in a rhombus or parallelogram shape may have two diagonal lengths (x, y) traversing each other.

Figure 5:
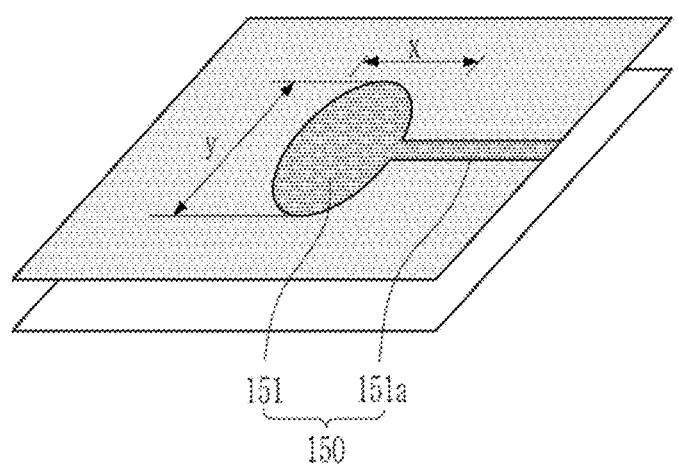

In an example described with reference to FIG. 5, the antenna 150 may include a patch 151 with an oval shape in a plan view and a feeder 151a extending from the patch 151. The oval patch 151 may have a short-axis length (x) and a long-axis length (y) traversing each other.

Figure 6:
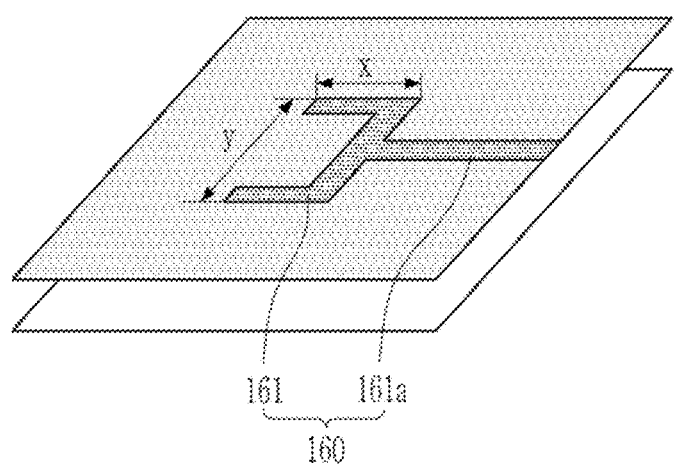

In an example described with reference to FIG. 6, the antenna 160 may include a patch 161 having a U-type planar shape in which one side is opened, and a feeder 161a extending from the patch 161. The U-type patch 161 may have a horizontal length (x) and a perpendicular length (y) measured in the direction traversing each other.

Figure 7:
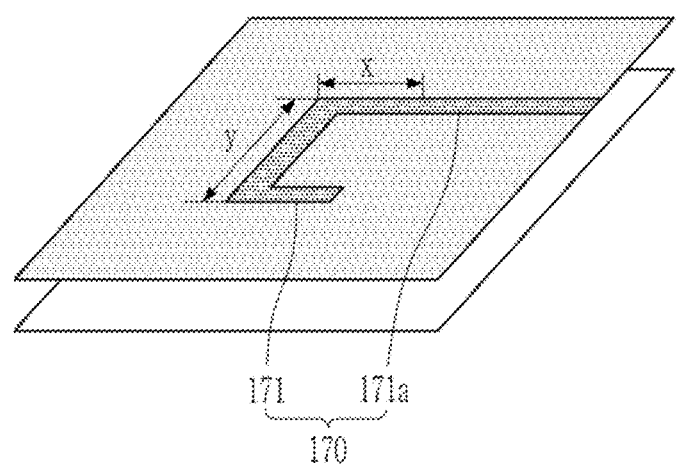

In an example described with reference to FIG. 7, the antenna 170 may include a patch 171 with a Π-type planar shape and a feeder 171a extending from the patch 171. The Π-type patch 171 may have a short-axis length (x) and a long-axis length (y) traversing each other.

Figure 8:
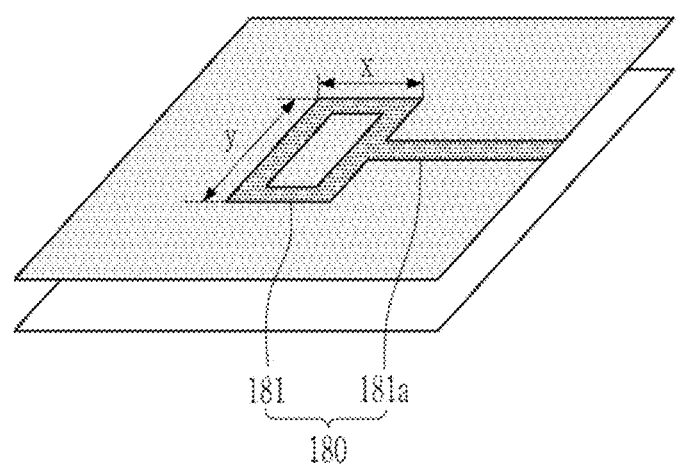

In an example described with reference to FIG. 8, the antenna 180 may include a patch 181 with a quadrangular shape of which a center is empty and a feeder 181a extending from the patch 181. The patch 181 having a quadrangular shape of which the center is empty may have a horizontal length (x) and a perpendicular length (y) measured in the direction traversing each other.

Figure 9:
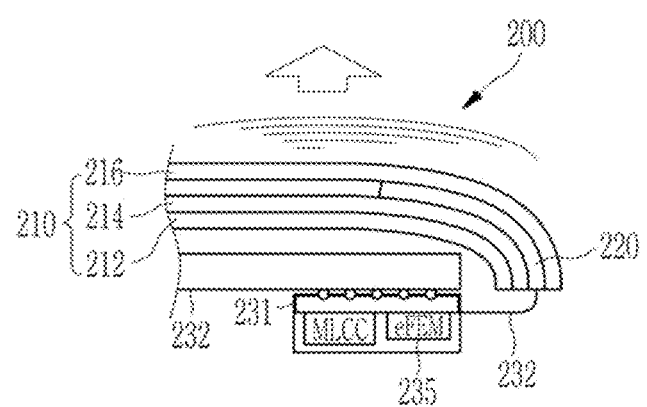
FIG. 9 illustrates a cross-sectional view on an example electronic device including a high frequency module, in accordance with one or more embodiments.

FIG. 9 illustrates a cross-sectional view of an example electronic device including a high frequency module, in accordance with one or more embodiments, and illustrating a cross-section of an example electronic device of which the display extends to a corner in a round way.

Referring to FIG. 9, the example electronic device 200 includes a display panel 210 that displays an image, and an antenna 220 positioned on a front side of the display panel 210.

In an example, the antenna 220 may be disposed on a stacked structure of the display panel 210. In an example, the display panel 210 includes an image display layer 212 and a TSP layer 214, and may include a cover glass 216 that covers and protects the image display layer 212 and a TSP layer 214. In this example, the antenna 220 may be positioned between the cover glass 216 and the TSP layer 214.

That is, the transmitting (Tx) patch and the receiving (Rx) patch with a number necessary for the configuration of the antenna 220 may be positioned on the TSP layer 214.

In the example, the display panel 210 may include a flexible image display layer 212 and a TSP layer 214. In an example, the display panel 210 may be provided so that an edge of the display screen may be bent to be a curve, and the display screen may extend to a lateral side of the display panel 210 from a front side thereof.

A first connecting member 231 may be positioned on a rear side of the display panel 210, and an extended front-end module (eFEM) chip 235 may be mounted on the first connecting member 231. In an example, a second connecting member 232, that electrically connects the first connecting member 231 and the antenna 220, may be provided, and the second connecting member 232 may be at least partially more flexible than the first connecting member 231, and may accordingly be bent for a connection. Therefore, the second connecting member 232 may be positioned to be bent on the lateral side of the display panel 210, and may connect the antenna 220 positioned on the front side of the display panel 210 and the eFEM chip 235 positioned on the rear side of the display panel 210. Accordingly, the antenna 220 may receive a signal from the eFEM chip 235.

Figure 10:
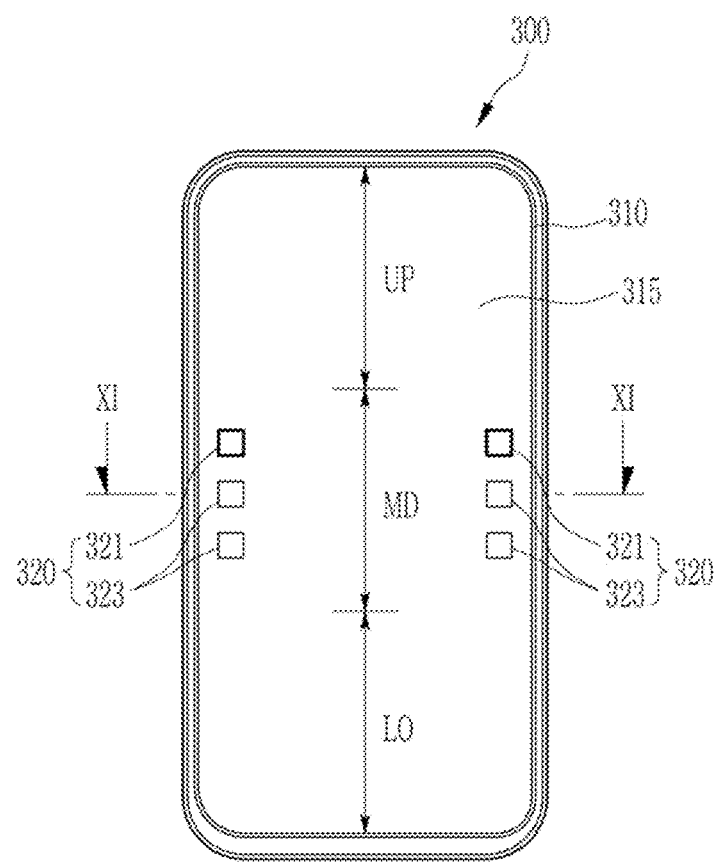
FIG. 10 illustrates a cross-sectional view on an example electronic device including a high frequency module, in accordance with one or more embodiments.

FIG. 10 illustrates a cross-sectional view of an example electronic device including a high frequency module, in accordance with one or more embodiments.

Referring to FIG. 10, regarding the electronic device 300 according to the example, the antenna 320 may be positioned adjacent to right and left edges of the middle region (MD) of the display screen 315 on the front side of the display panel 310. The plurality of antennae 320 may be positioned in pairs on the right and the left of the display screen 315, and in an example, the plurality of antennae 320 may include one pair of transmitting (Tx) patches 321 and two pairs of receiving (Rx) patches 323. That is, in an example, the plurality of antennae 320 may be configured with antennae with two Tx patches and four Rx patches.

Figure 11:
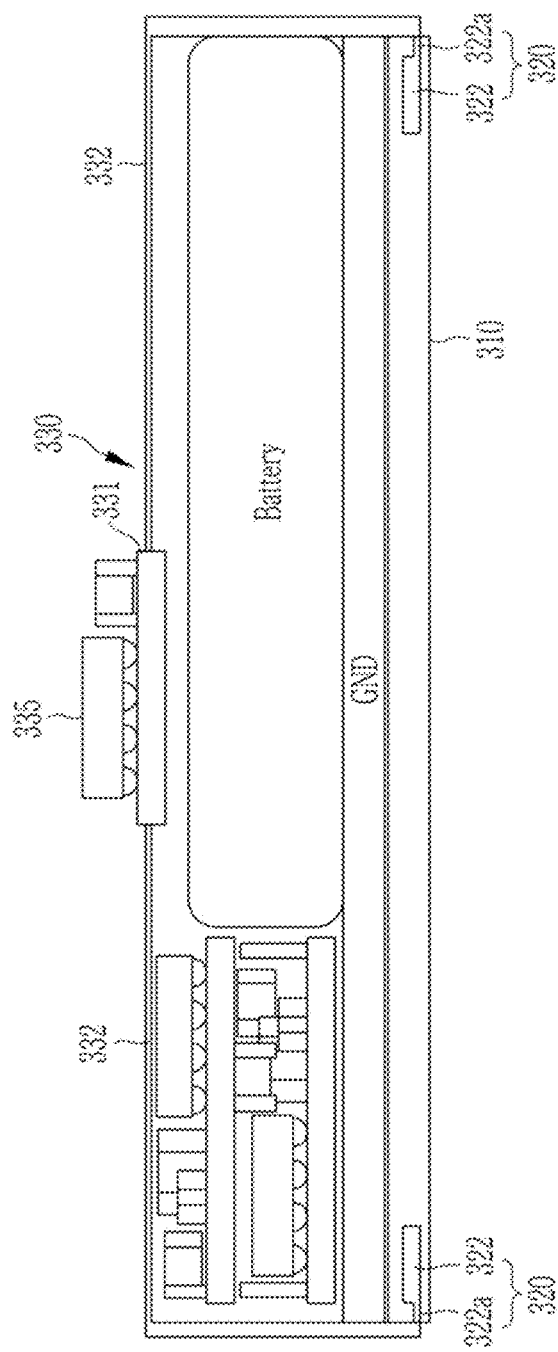
FIG. 11 illustrates a cross-sectional view with respect to a line XI-XI of FIG. 10.
Figure 12:
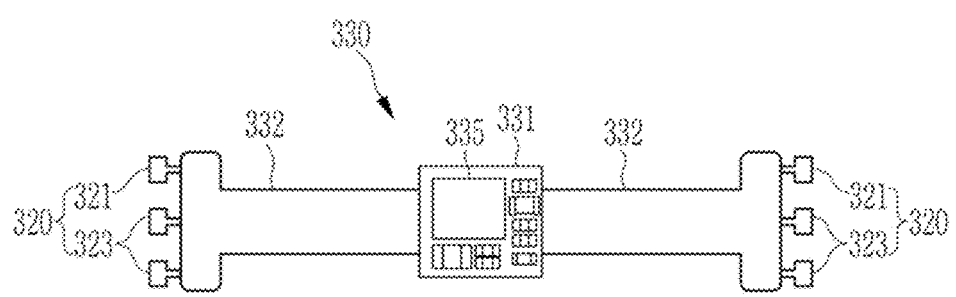
FIG. 12 illustrates a top plan view of a high frequency module shown in FIG. 10.

FIG. 11 illustrates a cross-sectional view with respect to a line XI-XI of FIG. 10, and FIG. 12 illustrates a top plan view of a high frequency module illustrated in FIG. 10.

In the example, the high frequency module 330 may be made of a PCB-LCP integrated board including a RFIC chip 335 and an antenna 320. That is, an electronic part including a RFIC chip 335 may be mounted on the board 331, and the connecting member 332, made of a material that is more flexible than the board 331, may extend to respective sides toward the edge of the display panel 310 from the board 331. The antenna 320 including a patch 322 and a feeder 322*a* may be connected to respective ends of the connecting member 332. The antenna 320 may be disposed on the front side of the display panel 310, and the board 331 may be disposed on the rear side of the display panel 310, so the connecting member 332 may be partly disposed to surround the lateral side of the display panel 310. The connecting member 332 may be made of a flexible printed circuit board (FPCB) including a liquid crystal polymer (LCP).

Figure 13:
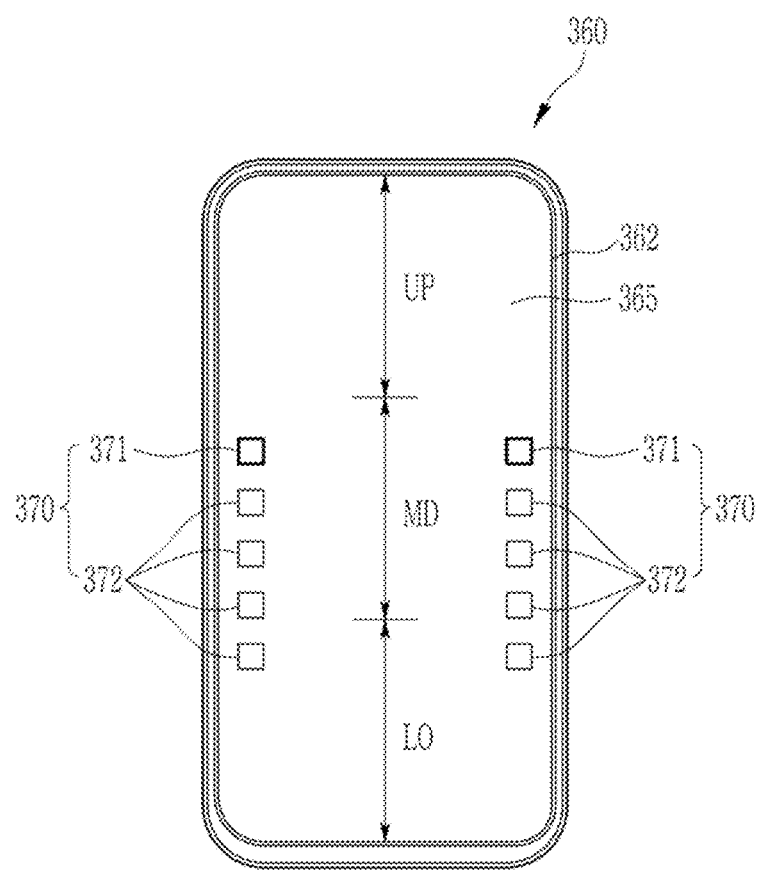
FIG. 13 and FIG. 14 illustrate top plan views on an example electronic device including a high frequency module, in accordance with one or more embodiments.
Figure 14:
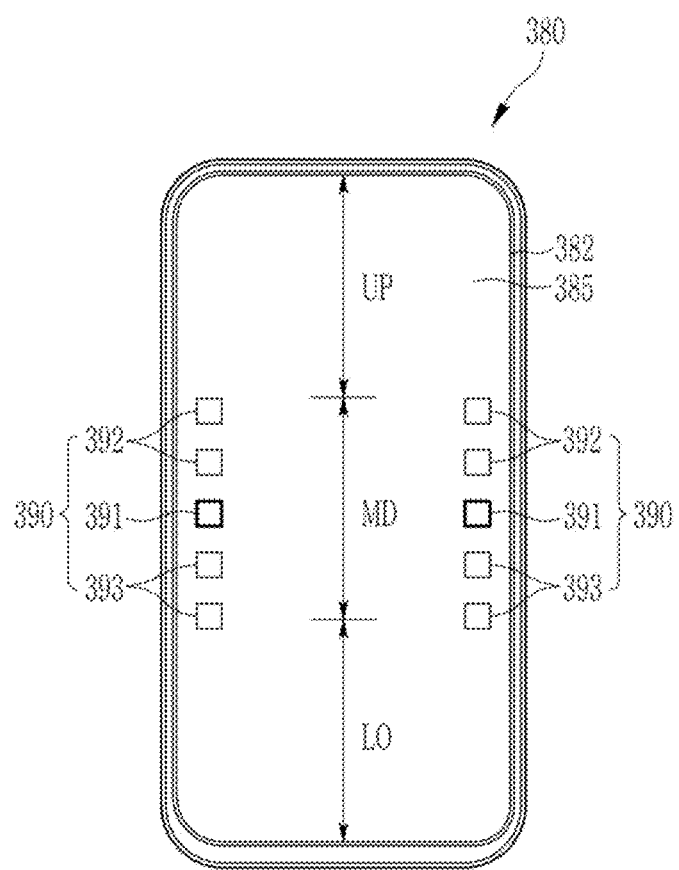

FIG. 13 and FIG. 14 illustrate top plan views on an electronic device including a high frequency module according to another embodiment.

Referring to FIG. 13, regarding the electronic device 360 according to the example, the antenna 370 may be positioned adjacent to the right and left edges on a portion of the middle region (MD) and a portion of the lower region (LO) of the display screen 365 on the front side of the display panel 362. In an example, a plurality of antennae 370 may be positioned in pairs on the right and the left sides of the display screen 365, and in an example, one pair of transmitting (Tx) patches 371 may be positioned at a highest end and four pairs of receiving (Rx) patches 372 may be positioned below them. That is, the plurality of antennae 370 may be configured with antennae with two Tx patches and eight Rx patches.

Referring to FIG. 14, regarding the electronic device 380 according to the example, the antenna 390 may be positioned adjacent to the right and left edges of the electronic device 380 in the middle region (MD) and portions of the upper and lower regions (UP and LO) of the display screen 385 on the front side of the display panel 382. A plurality of antennas 390 may be positioned in pairs on the right and the left edges of the display screen 385, and in an example, one pair of transmitting (Tx) patches 391 may be positioned in the center, two pairs of receiving (Rx) patches 392 may be positioned thereon, and the other two pairs of receiving (Rx) patches 393 may be position below the transmitting (Tx) patches 391. That is, the plurality of antennas 390 may be configured with antennae with two Tx patches and eight Rx patches.

Figure 15:
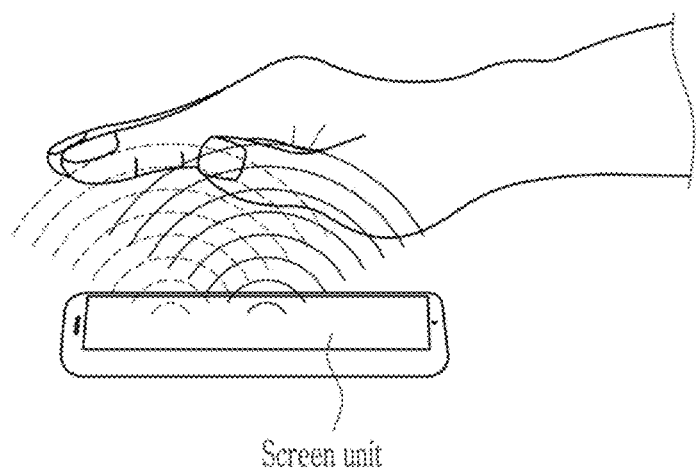
FIG. 15 illustrates an operation on a gesture sensing antenna in an example electronic device including a high frequency module, in accordance with one or more embodiments.

FIG. 15 illustrates an operation on a gesture sensing antenna in an electronic device including a high frequency module, in accordance with one or more embodiments.

According to the above-described examples, the antennas may be disposed on the display screen positioned on the front side of the display panel of the electronic device, so they may sense a gesture spaced from the screen unit, and moving on the front side of the screen unit, and may function as an input device. The antennae disposed on the display screen may be respectively positioned in the upper region (UP), the middle region (MD), and the lower region (LO) of the display screen or may be appropriately disposed, thereby setting a sensing range with respect to position.

Figure 16:
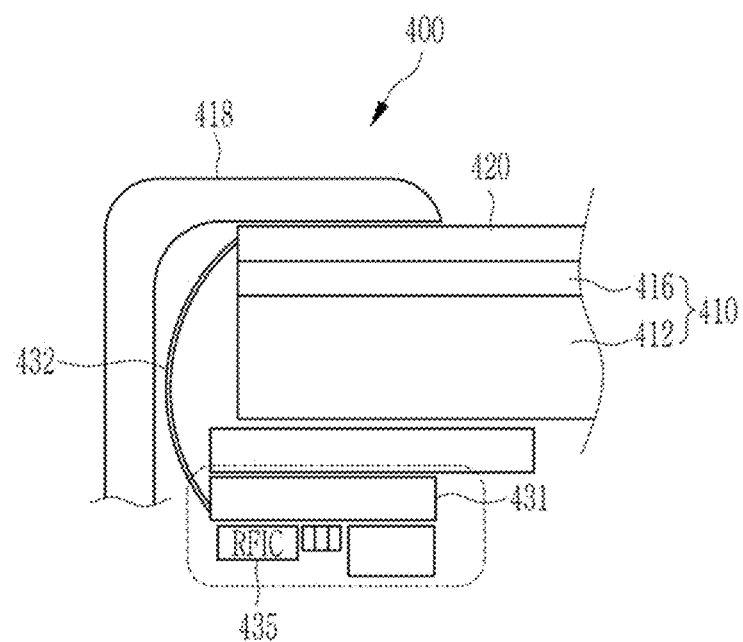
FIG. 16 illustrates a partial cross-sectional view on an example electronic device including a high frequency module, in accordance with one or more embodiments.

FIG. 16 illustrates a partial cross-sectional view on an example electronic device including a high frequency module, in accordance with one or more embodiments, illustrating an edge bezel and a portion for displaying an image display layer on the display panel of the electronic device.

In the present example, the antenna 420 may be disposed in the stacked structure of the display panel 410 and may be disposed to be at least partly covered by the bezel 418. In an example, the display panel 410 includes an image display layer 412 and may include a cover glass 416 to cover and protect the image display layer 412. The bezel 418 may cover the edge of the display panel 410 to conceal it, and in this example, the antenna 420 may be positioned on the cover glass 416. That is, a predetermined number of the transmitting (Tx) patches and receiving (Rx) patches to configure the antenna 420 may be positioned on the cover glass 416. The image display layer 412 may be selected in various ways according to the type of the display panel 410, and in a non-limiting example, may include an LCD or an OLED.

The first connecting member 431 may be positioned on the rear side of the display panel 410, and the RFIC chip 435 may be mounted on the first connecting member 431. Additionally, a second connecting member 432 that electrically connects the first connecting member 431 and the antenna 420 may be provided, and the second connecting member 432 may be at least partly more flexible than the first connecting member 431, so it may be bent for a connection. In an example, the first connecting member 431 may include a printed circuit board (PCB), and the second connecting member 432 may include, for example, a flexible printed circuit board (FPCB).

Figure 17:
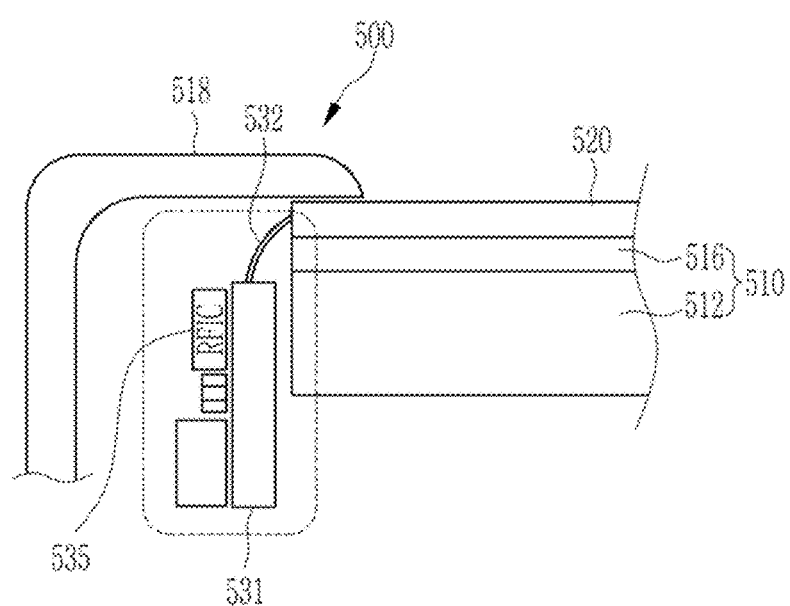
FIG. 17 illustrates a partial cross-sectional view on an example electronic device including a high frequency module, in accordance with one or more embodiments.

FIG. 17 illustrates a partial cross-sectional view on an example electronic device including a high frequency module according to another embodiment, illustrating an edge bezel and a portion for displaying an image display layer on the display panel of the electronic device.

In the present example, the antenna 520 is disposed in the stacked structure of the display panel 510, and may be disposed to be at least partly covered by the bezel 518. In an example, the display panel 510 may include an image display layer 512 and may include a cover glass 516 to cover and protect the image display layer 512. The bezel 518 may cover the edge of the display panel 510 to conceal it, and in this example, the antenna 520 may be positioned on the cover glass 516. That is, a predetermined number of the transmitting (Tx) patches and the receiving (Rx) patches to configure the antenna 520 may be positioned on the cover glass 516. The image display layer 512 may be selected in various ways according to the type of the display panel 510, and for example, it may include an LCD or an OLED.

In an example, the first connecting member 531 may be positioned on a lateral side of the display panel 510, and the RFIC chip 535 may be mounted on the first connecting member 531. Additionally, a second connecting member 532 that electrically connects the first connecting member 531 and the antenna 520 may be provided, and the second connecting member 532 may be at least partly more flexible than the first connecting member 531, so that it may be bent for a connection. In an example, the first connecting member 531 may include a printed circuit board (PCB), and the second connecting member 532 may include, for example, a flexible printed circuit board (FPCB).

FIG. 18 to FIG. 21 illustrate front views of example smart glasses including a high frequency module, in accordance with one or more embodiments.

In the present example, smart glasses 610, 630, 650, and 670 may include glasses frames 612, 632, 652, and 672 and lenses 614, 615, 634, 635, 654, 655, 674, and 675, and the lenses 614, 615, 634, 635, 654, 655, 674, and 675 may include transparent display panels. The antennae 620, 640, 660, and 680 may be positioned adjacent to the edges of the lenses 614, 615, 634, 635, 654, 655, 674, and 675 including a transparent display panel. A plurality of antennae 620, 640, 660, and 680 may be disposed to be spread on the edges of the lenses 614, 615, 634, 635, 654, 655, 674, and 675, and in an example, the right eye lenses 614, 634, 654, and 674 and the left eye lenses 615, 635, 655, and 675 may respectively include, as non-limiting examples, one transmitting (Tx) patch 621, 641, 661, and 681 and two receiving (Rx) patches 622, 642, 662, and 682. In an example, the transmitting (Tx) patches 621, 641, 661, and 681 and the receiving (Rx) patches 622, 642, 662, and 682 of the right eye lenses 614, 634, 654, and 674 and the left eye lenses 615, 635, 655, and 675 may be disposed linearly symmetrically with respect to a vertical line (V) passing through bridges 612b, 632b, 652b, and 672b.

Figure 18:
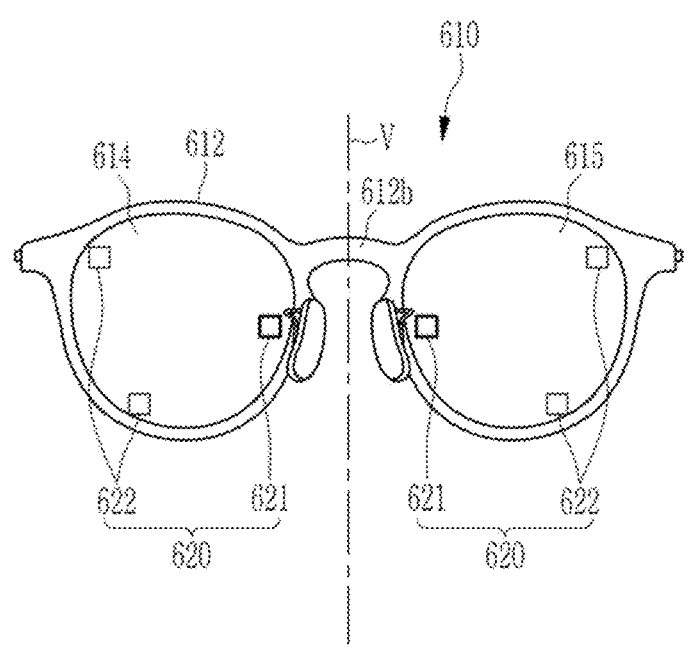
FIGS. 18 to 21 illustrate front views on an example smart glasses including a high frequency module, in accordance with one or more embodiments.
Figure 19:
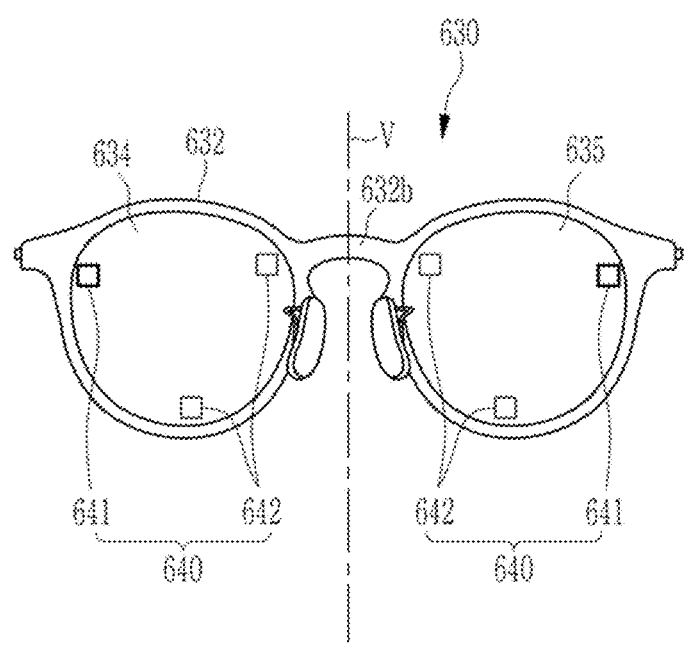
Figure 20:
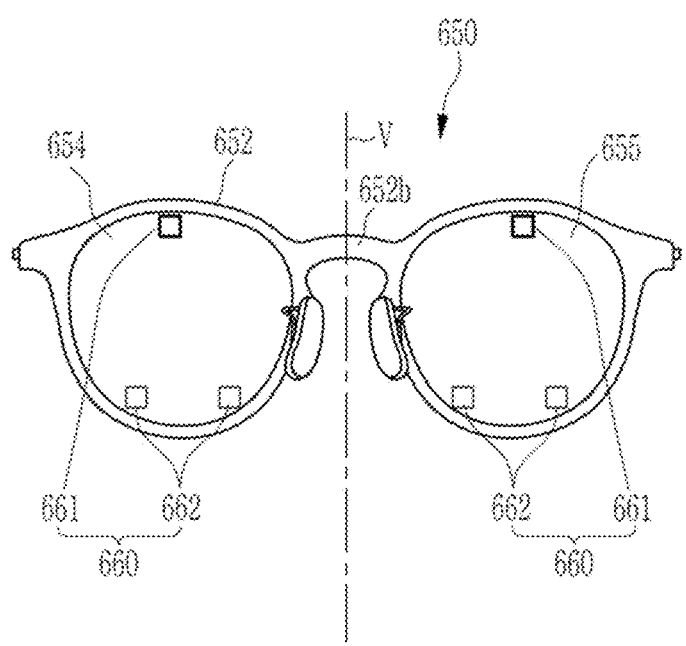

FIG. 18 illustrates that the transmitting (Tx) patch 621 may be disposed near the bridge 612b, FIG. 19 illustrates that the transmitting (Tx) patch 641 may be disposed near a glasses bridge, and FIG. 20 illustrates that the transmitting (Tx) patch 661 may be disposed near an upper end of the glasses frame 654.

Figure 21:
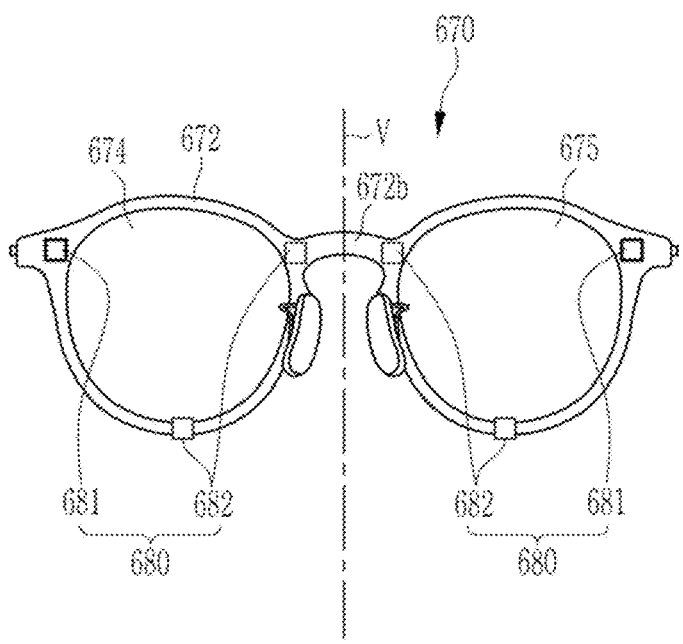

FIG. 21 illustrates an example that an antenna 680 is disposed on a surface of a glasses frame 672. In a similar manner, a plurality of antennae 680 may be disposed to be spread along the glasses frame 672, and in an example, the right eye glasses frame and the left eye glasses frame may respectively include one transmitting (Tx) patch 681 and two receiving (Rx) patches 682. In an example, the transmitting (Tx) patch 681 and the receiving (Rx) patch 682 of the right eye glasses frame and the left eye glasses frame may be linearly symmetrically disposed with respect to the vertical line (V) passing through the bridge 672b.

In the present example, the antennae 620, 640, 660, and 680 disposed on the lenses 614, 615, 634, 635, 654, 655, 674, and 675 or the glasses frames 612, 632, 652, and 672 of the smart glasses 610, 630, 650, and 670 may be used as gesture sensing antennae. In an example, the antennae 620, 640, 660, and 680 may be configured to be operable in a frequency bandwidth equal to or greater than 60 GHz by using the super high frequency of mmWave, and may be applied to gesture sensing. That is, the high frequency module may be realized to include the transmitting and/or receiving (Tx/Rx) ends of the antenna manufactured as a 60 GHz WiGig or a 77 GHz Radar, and the RFIC.

Figure 22:
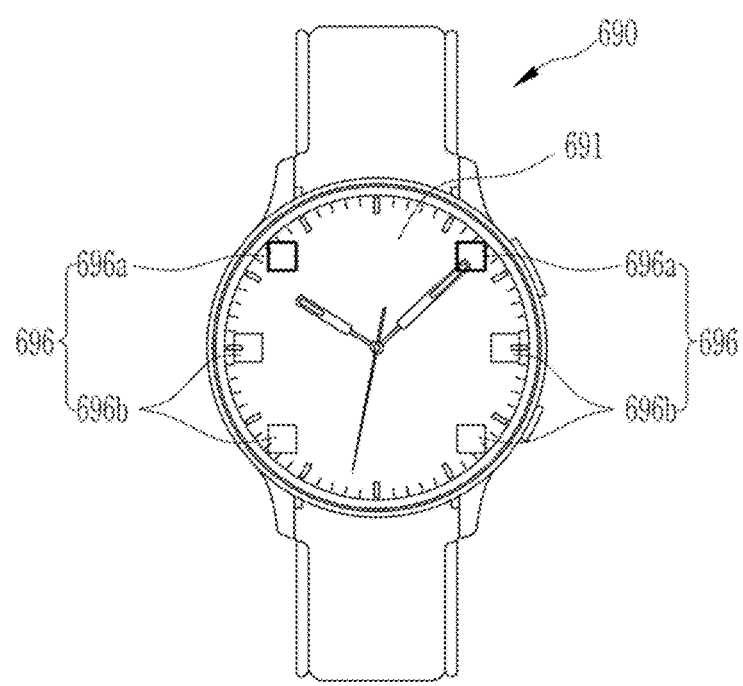
FIG. 22 illustrates a partial cross-sectional view on an example smart watch including a high frequency module, in accordance with one or more embodiments.

FIG. 22 illustrates a partial cross-sectional view of a smart watch including a high frequency module, in accordance with one or more embodiments.

In the present example, a smart watch 690 may include a display panel that displays an image, and an antenna 696 positioned on the front side of the display panel. The antenna 696 may be positioned adjacent to the edge of the display screen 691 on the front side of the display panel. A plurality of antennae 696 may be positioned in pairs on the right side and the left side of the display screen 691, and in an example, the plurality of antennae 696 may include one pair of transmitting (Tx) patches 696a and two pairs of receiving (Rx) patches 696b.

In the present example, the antenna 696 disposed on the display panel of the smart watch 690 may be used as a gesture sensing antenna. in an example, the antenna 696 may be configured to be operable in a frequency bandwidth that is equal to or greater than 60 GHz by using the super high frequency of mmWave, and may be applied to gesture sensing. That is, the high frequency module may be realized to include the transmitting and/or receiving (Tx/Rx) ends of the antenna manufactured as a 60 GHz WiGig or a 77 GHz Radar, and the RFIC.

Figure 23:
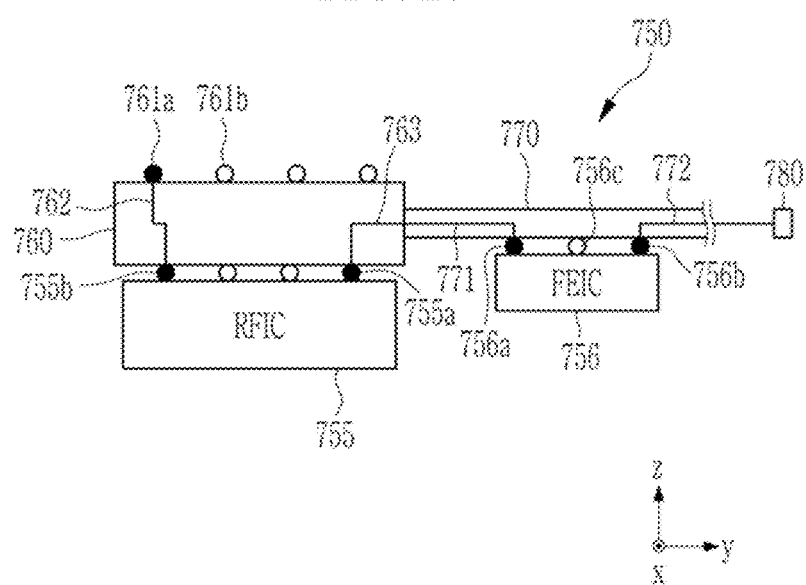
FIG. 23 illustrates a high frequency module, in accordance with one or more embodiments.

FIG. 23 illustrates a high frequency module, in accordance with one or more embodiments.

The high frequency module 750, in accordance with one or more embodiments, may include a radio frequency integrated circuit (RFIC) 755, a first connecting member 760, a second connecting member 770, and a front-end integrated circuit (FEIC) 756.

The RFIC 755 may include a base access end 755b that allows a base signal to pass through, and a first RF (Radio Frequency) access end 755a that allows a first RF signal having a higher frequency than the frequency of the base signal to pass through. The first RF access end 755a and the base access end 755b may, for example, be realized as a pin of the RFIC 755 or a solder ball, a pad, and a land of the first connecting member 760, and they may support mounting of the RFIC 755 on the first connecting member 760. The base signal may be an intermediate frequency (IF) signal or a baseband signal, and it may include data according to a method based on a communication protocol of a RF signal and/or a communication signal.

The RFIC 755 may generate a RF signal and/or a gesture sensing signal by processing (e.g., frequency conversion, filtering, phase control, etc.) the base signal, and may generate a base signal by processing the RF signal and/or the gesture sensing signal.

In an example, the high frequency module 750 may further include electrical connection structure bodies 761a and 761*b* electrically connected to the base wire 762 and disposed on a first side (e.g., an upper side) of the first connecting member 760, and the RFIC 755 may be disposed on a second side (e.g., a lower side) of the first connecting member 760. In an example, the electrical connection structure bodies 761*a* and 761*b* may be realized as a pin, a solder ball, a pad, or a land, and may support mounting of the first connecting member 760 on the base board.

The first connecting member 760 includes a base wire 762 electrically connected to a base access end 755*b* of the RFIC 755 and configured to allow the base signal to pass through, and a first RF wire 763 electrically connected to a first RF access end 755*a* of the RFIC 755, and configured to allow the first RF signal to pass through, and it may provide a disposal space of the RFIC 755. In an example, the first connecting member 760 may have a structure in which at least one insulation layer and at least one wiring layer are alternately stacked in a like manner of the printed circuit board (PCB).

The base wire 762 and the first RF wire 763 may have a structure in which a strip disposed on a horizontal side (e.g., an xy side) is combined to a via that extends in an up and down direction (e.g., a z direction). The strip may be disposed on the at least one wire layer, and the via may be disposed to penetrate through the insulation layer.

The second connecting member 770 may include a second RF wire 771 electrically connected to the first RF wire 763, and a third RF wire 772 that allows a first gesture sensing signal to pass through, and at least part thereof may be configured to be more flexible than the first connecting member 760.

As the second connecting member 770 is made more flexible than the first connecting member 760, it may be flexibly bent. Accordingly, a second outside (e.g., a right lateral side) of the second connecting member 200 is seldom limited by a position of a first outside (e.g., a left lateral side) and may be freely connected to the antenna 780, and the high frequency module 750 is seldom limited by the structure of the connection target but may be more freely disposed.

In an example, the second connecting member 770 may include a flexible insulation layer that is more flexible than the insulation layer of the first connecting member 760. The flexible insulation layer may be realized with a polyimide or a liquid crystal polymer (LCP), but is not limited thereto.

In an example, the first and second connecting members 760 and 770 may be realized with rigid and flexible printed circuit boards, and may be realized by a method that removes part (e.g., a portion that overlaps the second connecting member in the up and down direction) of the insulation layer in the structure in which the insulation layer and the flexible insulation layer are stacked. Therefore, when the second connecting member 770 is more flexible than the first connecting member 760, part of the insulation layer of the first connecting member 760 may be realized with a same material as the flexible insulation layer of the second connecting member 770.

Depending on various examples, the first and second connecting members 760 and 770 may be realized with a flexible printed circuit board (FPCB), and may be more flexible than the RFIC 755 or antenna parts.

The FEIC 756 may be disposed on the second connecting member 770, and it may be configured to generate the first gesture sensing signal by amplifying the first RF signal, or generate the first RF signal by amplifying the first gesture sensing signal.

In an example, the FEIC 756 may include at least one of a power amplifier, a low noise amplifier, and a transmitting and/or receiving switch. The power amplifier, the low noise amplifier, and the transmitting and/or receiving switch may be realized with a combination of semiconductor transistor elements and impedance elements, and they are not limited thereto.

A frequency of the first gesture sensing signal may be substantially equivalent to a frequency of the first RF signal, and the first gesture sensing signal may be transmitted to the antenna 780 through the second outside (e.g., a right lateral side) of the second connecting member 770, or may be received from the antenna 780.

The FEIC 756 may be electrically connected to the second RF wire 771 of the second connecting member 770 through the first FE access end 756*a*, and may be electrically connected to the third RF wire 772 of the second connecting member 770 through the second FE access end 756*b*. In an example, a plurality of FE access ends may include first and second FE access ends 756*a* and 756*b*, and may be realized as the pin of the FEIC 756 or the solder ball, the pad, or the land of the second connecting member 770, and may support mounting of the FEIC 756 on the second connecting member 770.

The FEIC 756 may amplify the first RF signal and/or the first gesture sensing signal, and the RFIC 755 may not include a front-end amplifying circuit (e.g., a power amplifier or a low-noise amplifier).

Acquisition of performance (e.g., power consumption, a linearity characteristic, a noise characteristic, a size, a gain, etc.) of the front-end amplifying circuit may be more difficult than acquisition of performance of a circuit that performs other operations except the amplification in the RFIC 755, so compatibility of the circuit for performing other operations except the amplification in the RFIC 755 may be relatively low.

In an example, the front-end amplifying circuit may obtain performance when it is realized not with a general CMOS-based IC but with other types (e.g., a compound semiconductor) of IC, when it is configured to have an efficient structure to receive impedance of passive elements, or when it is separately realized while optimized with specifically required performance.

Therefore, the high frequency module has a configuration in which the FEIC 756, that performs a front-end amplifying operation, is separately realized from the RFIC 755 to perform other operations except the front-end amplification, thereby obtaining performance of the amplifying circuit and performance of the circuit to perform other operations except the front-end amplification of the RFIC 755.

Further, power consumption and/or heating by the front-end amplifying circuit may be greater than power consumption and/or heating by the circuit for performing other operations except the front-end amplification of the RFIC 755.

The high frequency module may have the configuration in which the FEIC 756 that performs the front-end amplification operation is separately realized from the RFIC 755 that performs other operations except the front-end amplification operation, thereby increasing power consumption efficiency, and efficiently forming the heat dispersing route.

An energy loss generated when the RF signal and/or the gesture sensing signal are/is transmitted may increase as power of the RF signal and/or the gesture sensing signal becomes bigger. As the FEIC 756 that performs the front-end amplification operation is separately realized from the RFIC 755 that performs other operations except the front-end amplification operation, the FEIC 756 may be more closely electrically connected to an external connection object (e.g., an antenna or a display member), so an electrical length of a transmission path of the finally amplified transmitting RF signal to the external connection object (e.g., an antenna or a display member) may be more easily reduced, and energy efficiency of the high frequency module according to an example may be further improved.

The high frequency module according to the example includes the configuration in which the FEIC 756 that performs the front-end amplification operation is separately realized from the RFIC 755 that performs other operations except the front-end amplification operation, thereby more efficiently compensating the relatively low antenna performance of the external connection object (e.g., an antenna or a display member).

Figure 24:
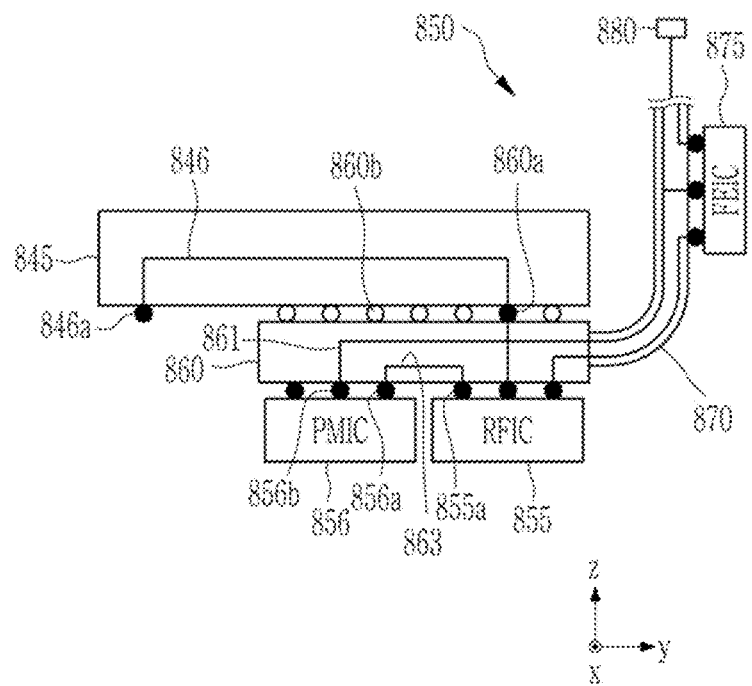
FIG. 24 illustrates a cross-sectional view on a high frequency module, in accordance with one or more embodiments.

FIG. 24 illustrates a cross-sectional view of a high frequency module, in accordance with one or more embodiments.

The high frequency module 850 according to the example may further include a power management integrated circuit (PMIC) 856, and the PMIC 856 may supply a power voltage to the RFIC 855 through the first PM access end 856*a*, and may supply the power voltage to the FEIC 875 through the second PM access end 856*b*.

A plurality of PM access ends may include first and second PM access ends 856*a* and 856*b*, that may be realized as a pin of the PMIC 856 or a solder ball, a pad, or a land of the first connecting member 860 or the base board 845, and they may support mounting of the PMIC 856 on the first connecting member 860 or the base board 845.

The PMIC 856 may be mounted on the first connecting member 860, a plurality of access ends of the RFIC 855 may further include a power access end 855*a* electrically connected to the first PM access end 856*a*, and the first connecting member 860 may further include a first power wire 863 electrically connected between the first PM access end 856*a* and the power access end 855*a*, and a second power wire 861 electrically connected between the first PM access end 856*a* and the FEIC 875.

The base board 845 may include a base wire 846 that is electrically connected between the first and second base electrical connection structure bodies 860*a* and 846*a*, and may provide an electrical path between the RFIC 855 and the second base electrical connection structure body 846*a*.

In an example, the second base electrical connection structure body 846*a* is electrically connected to the intermediate frequency integrated circuit (IFIC) or the baseband IC, and may support mounting of the IFIC or the baseband IC on the base board 845.

Figure 25:
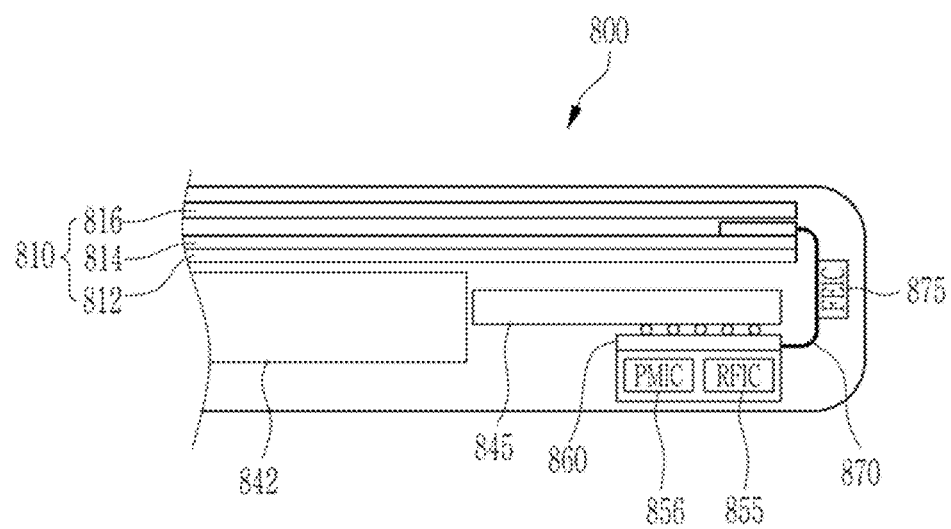
FIG. 25 illustrates an example electronic device including a high frequency module, in accordance with one or more embodiments shown in FIG. 24.

FIG. 25 illustrates an example electronic device including a high frequency module according to an example illustrated in FIG. 24.

The electronic device 800 may include a base board 845, a display panel 810, a battery 842, and a high frequency module including a FEIC 875. The display panel 810 may include a cover member 816, an image display layer 812, and a TSP layer 814.

In an example, the electronic device 800 may be, as non-limiting examples, a smart phone, a personal digital assistant, a digital video camera, a digital still camera, a network system, a computer, a monitor, a tablet, a laptop, a netbook, a television, a video game, a smart watch, and an automotive part, but is not limited thereto.

The base board 845 may include a communication module or device and a gesture sensing module or device. The communication module or device or the gesture sensing module or device may include at least some of a memory chip including a volatile memory (e.g., a DRAM), a non-volatile memory (e.g., a ROM), and a flash memory; an application processor chip including a central processor (e.g., a CPU), a graphics processor (e.g., a GPU), a digital signal processor, an encoding processor, a microprocessor, and a microcontroller; and a logic chip including an analog-digital converter, and an application-specific IC (ASIC), for processing digital signals.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An electronic device, comprising:
 a display panel, comprising a display screen configured to display an image, and a touch screen panel layer;
 an antenna, attached to the display panel, and including an antenna patch and a feeder patterned on the touch screen panel layer;
 a first connecting member, positioned external to the display screen;
 a radio frequency (RF) signal processing circuit, mounted on the first connecting member; and
 a second connecting member, configured to electrically connect the first connecting member and the antenna, and configured to be more flexible than the first connecting member.

2. The electronic device of claim 1, wherein the antenna is positioned adjacent to a right edge and a left edge of the display screen.

3. The electronic device of claim 2, wherein:
 the display screen is vertically partitioned in an upper region, a middle region, and a lower region, and
 the antenna is positioned in at least one region of the upper region, the middle region, and the lower region.

4. The electronic device of claim 2, wherein the antenna is configured so that a plurality of antenna patches are formed in pairs to be symmetric with respect to a width-directional center axis of the display screen, and are positioned on the right edge and the left edge of the display screen.

5. The electronic device of claim 4, wherein the antenna patches comprise at least one pair of transmitting antenna patches and at least one pair of receiving antenna patches.

6. The electronic device of claim 1, wherein:
 the display panel is configured to have a stacked structure including a plurality of layers.

7. The electronic device of claim 6, wherein:
 the display panel further comprises an image display layer and the touch screen panel layer is stacked on the image display layer.

8. The electronic device of claim 6, wherein:
the antenna is formed with a plurality of antenna patches and feeders that are patterned on the touch screen panel layer.

9. The electronic device of claim 6, wherein:
the display panel further comprises a cover glass.

10. The electronic device of claim 1, further comprising:
a bezel, configured to cover at least a portion of an edge of the display panel,
wherein the antenna is at least partly positioned on a portion of the display panel covered with the bezel.

11. The electronic device of claim 1, wherein the antenna patch has a plane in parallel to a surface of the display screen, and the feeder extends from the antenna patch.

12. The electronic device of claim 1, wherein the first connecting member is positioned on one of a lateral side and a rear side of the display panel.

13. The electronic device of claim 1, wherein the RF signal processing circuit includes one of a radio frequency integrated circuit (RFIC) chip and an extended front-end module (eFEM) chip.

14. The electronic device of claim 1, wherein the antenna and the RF signal processing circuit are configured to be a printed circuit board (PCB)—liquid crystal polymer (LCP) integrated board.

15. The electronic device of claim 1, wherein the antenna is a gesture sensing antenna configured to be operable in a frequency bandwidth equal to or greater than 60 GHz.

16. A smart glasses device, comprising:
a lens, comprising a transparent display panel comprising a display screen configured to display an image;
an antenna, positioned adjacent to an edge of the lens; and
a glasses frame, coupled with the lens, and configured to support the lens.

17. The smart glasses device of claim 16, wherein the antenna is coupled to the transparent display panel, and is positioned on the display screen.

18. The smart glasses of claim 16, wherein the antenna is positioned on the glasses frame.

19. A smart watch device, comprising:
a display panel comprising a display screen configured to display an image, and a touch screen panel layer; and
an antenna, positioned adjacent to an edge of the display screen and including an antenna patch and a feeder patterned on the touch screen panel layer.

20. The smart watch device of claim 19, wherein the antenna is positioned adjacent to an outer edge of the display screen.

21. The smart watch device of claim 19, wherein the antenna is configured so that a plurality of antenna patches are formed in pairs to be symmetric with respect to a width-directional center axis of the display screen.

22. The smart watch device of claim 21, wherein the plurality of antenna patches comprises one pair of transmitting antenna patches and two pairs of receiving antenna patches.

23. The smart watch device of claim 19, wherein the antenna is a gesture sensing antenna.

\* \* \* \* \*